US010741868B2

(12) United States Patent
Jung

(10) Patent No.: US 10,741,868 B2
(45) Date of Patent: Aug. 11, 2020

(54) FUEL CELL STACK AND VEHICLE WITH A FUEL CELL STACK

(71) Applicants: Mahle Donghyun Filter Systems Co., Ltd., Ulsam (KR); Mahle International GmbH, Stuttgart (DE)

(72) Inventor: Chanjung Jung, Gyeonggi-Do (KR)

(73) Assignees: MAHLE DONGHYUN FILTER SYSTEMS CO., LTD. (KR); MAHLE INTERNATIONAL GMBH (DE)

( * ) Notice: Subject to any disclaimer, the term of this patent is extended or adjusted under 35 U.S.C. 154(b) by 0 days.

(21) Appl. No.: 16/488,113

(22) PCT Filed: Feb. 15, 2018

(86) PCT No.: PCT/EP2018/053812
§ 371 (c)(1),
(2) Date: Aug. 22, 2019

(87) PCT Pub. No.: WO2018/153771
PCT Pub. Date: Aug. 30, 2018

(65) Prior Publication Data
US 2019/0379082 A1    Dec. 12, 2019

(30) Foreign Application Priority Data

Feb. 22, 2017  (KR) .................. 10-2017-0023479

(51) Int. Cl.
| | |
|---|---|
| *H01M 8/2475* | (2016.01) |
| *H01M 8/2484* | (2016.01) |
| *B60L 50/72* | (2019.01) |
| *B01D 46/00* | (2006.01) |
| *H01M 8/0247* | (2016.01) |
| *H01M 8/0662* | (2016.01) |

(52) U.S. Cl.
CPC ...... *H01M 8/2475* (2013.01); *B01D 46/0004* (2013.01); *B60L 50/72* (2019.02); *H01M 8/0247* (2013.01); *H01M 8/0687* (2013.01); *H01M 8/2484* (2016.02)

(58) Field of Classification Search
CPC ............. H01M 8/2475; H01M 8/0687; H01M 2250/20; B01D 46/0004; Y02T 90/32
See application file for complete search history.

(56) References Cited

U.S. PATENT DOCUMENTS

| | | | |
|---|---|---|---|
| 2007/0087241 A1 | 4/2007 | Mulvenna et al. | |
| 2009/0017745 A1 | 1/2009 | Kum et al. | |
| 2009/0191805 A1 | 7/2009 | Cusumano et al. | |
| 2010/0086810 A1 | 4/2010 | Hood et al. | |
| 2014/0322620 A1* | 10/2014 | Ge ................... | H01M 8/04201 429/410 |

FOREIGN PATENT DOCUMENTS

| | | |
|---|---|---|
| JP | 2006-147317 A | 6/2006 |
| KR | 10-2011-0012124 A | 2/2011 |
| KR | 10-2016-0039863 A | 4/2016 |

OTHER PUBLICATIONS

English abstract for JP-2006-147317.
English abstract for KR-10-2011-0012124.
English abstract for KR-10-2016-0039863.

* cited by examiner

*Primary Examiner* — Ladan Mohaddes
(74) *Attorney, Agent, or Firm* — Fishman Stewart PLLC

(57) ABSTRACT

A vehicle may include an engine compartment and a fuel cell stack arranged in the engine compartment. The fuel cell stack may include an enclosure having an interior space and a cell disposed in the interior space of the enclosure configured to generate electrical energy. The enclosure may include an enclosure inlet guiding air from an exterior of the enclosure to the interior space, and an enclosure outlet guiding air from the interior space to the exterior. The fuel cell stack may also include a filter preventing foreign matter from being introduced into the interior space of the enclosure arranged in the enclosure inlet. The filter may include a filter member covering the enclosure inlet and a filter cover covering the filter member. The filter cover may include a filter cover inlet guiding air to the filter member. The filter cover inlet may fluidically communicate with the engine compartment.

20 Claims, 3 Drawing Sheets

134

134a  134b

FUEL CELL STACK AND VEHICLE WITH A FUEL CELL STACK

CROSS-REFERENCE TO RELATED APPLICATIONS

This application claims priority to International Patent Application No. PCT/EP2018/053812, filed Feb. 15, 2018, and Korean Patent Application No. KR 10-2017-0023479, filed Feb. 22, 2017, the contents of both of which are hereby incorporated by reference in their entirety.

TECHNICAL FIELD

The present invention relates to a fuel cell stack, and, more specifically, to a fuel cell stack capable of supplying electrical energy to a vehicle. Furthermore, the invention also relates to a vehicle equipped with such a fuel cell stack.

BACKGROUND

Generally, a fuel cell is a device that directly converts chemical energy stored in a fuel into electrical energy by an electrochemical reaction.

These fuel cells are being applied to vehicles recently with the object of reducing environmental pollution and resource depletion, and fuel cells applied to a vehicle are formed into stacks of individual unit cells stacked to generate the considerable potential required to drive the vehicle. In other words, fuel cells applied to vehicles are formed into so-called fuel cell stacks.

Referring to Republic of Korea Registered Patent Gazette No. 10-1610115, a conventional fuel cell stack includes an enclosure (30) having an interior space and a cell that is disposed in the interior space of the enclosure (30) and that generates electrical energy; the cells are formed as a plurality, and the plurality of cells are stacked to form a unit stack module (10).

Additionally, in the enclosure are formed an enclosure inlet and an enclosure outlet (31) for supplying and discharging air required for the electrochemical reaction of the cell.

However, such a conventional fuel cell stack had the problem of foreign matter being introduced into the interior of the enclosure. And the conventional fuel cell stack had problems in that, due to the foreign matter, the fuel cell stack would overheat, the performance and efficiency of the fuel cell stack would fall, and short circuits would occur.

Patent Document—Republic of Korea Registered Patent Gazette No. 10-1610115.

SUMMARY

Accordingly, the object of the present invention is to provide a fuel cell stack capable of preventing foreign matter from being introduced into the interior of an enclosure.

To achieve the above-mentioned object, the present invention provides a fuel cell stack including: an enclosure having an interior space, and a cell that is disposed in the interior space of the enclosure and that generates electrical energy; the enclosure including: an enclosure inlet for guiding air from the exterior of the enclosure to the interior space of the enclosure, and an enclosure outlet for guiding air from the interior space of the enclosure to the exterior of the enclosure; wherein a filter for preventing foreign matter from being introduced into the interior space of the enclosure is formed in the enclosure inlet.

The enclosure and filter may be formed such that the flow rate of air entering the filter is less than or equal to a predetermined rate.

The enclosure and filter may be formed such that air is supplied directly to the filter from the engine compartment of the vehicle.

The enclosure includes: a front surface facing towards the front of the vehicle, a rear surface facing towards the rear of the vehicle, a side surface facing towards the side of the vehicle, an upper surface facing towards the top of the vehicle, and a lower surface facing towards the bottom of the vehicle; the filter may be formed on any one of the rear surface, side surface, upper surface, or lower surface of the enclosure.

The filter includes: a filter member covering the enclosure inlet, and a filter cover covering the filter member; wherein the filter cover includes a filter cover inlet for guiding air to the filter member, and the filter cover inlet can communicate with the engine compartment.

The filter cover inlet may be formed so that at least part of the filter cover inlet is open in a direction different from the front of the vehicle.

The filter cover may include a partition interposed between the filter member and the filter cover inlet.

The partition may be formed so that air introduced into the filter cover inlet collides with the partition and is then guided to the filter member.

The enclosure outlet may communicate with the air cleaner of the vehicle.

A fuel cell stack according to the present invention includes: an enclosure having an interior space, and a cell that is disposed in the interior space of the enclosure and that generates electrical energy; the enclosure including: an enclosure inlet for guiding air from the exterior of the enclosure to the interior space of the enclosure, and an enclosure outlet for guiding air from the interior space of the enclosure to the exterior of the enclosure; wherein a filter for preventing foreign matter from being introduced into the interior space of the enclosure may be formed in the enclosure inlet. It is thereby possible to prevent foreign matter from being introduced into the interior of the enclosure.

DETAILED DESCRIPTION

A fuel cell stack according to the present invention is described in detail below with reference to the attached drawings.

Figure 1:
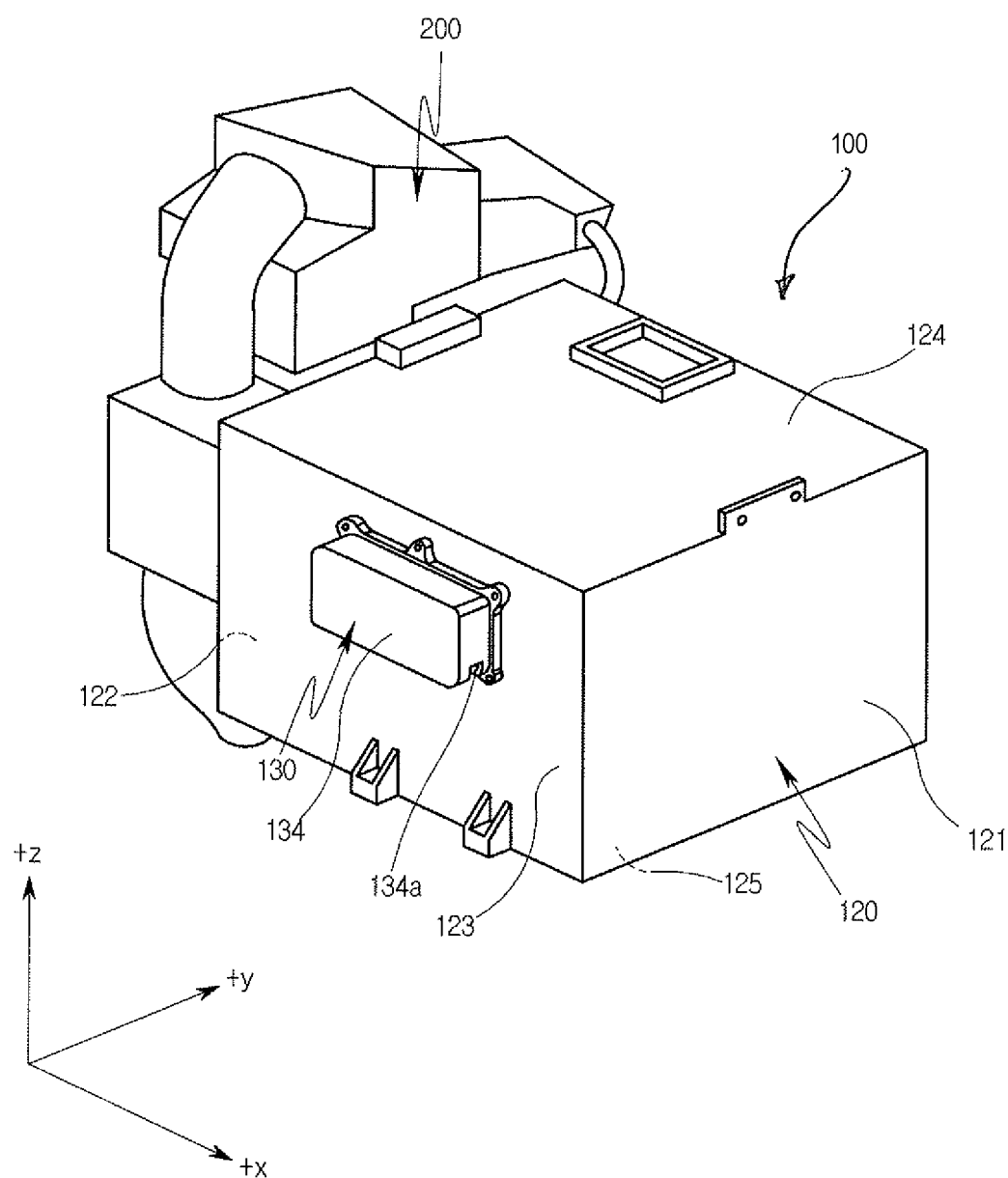
FIG. 1 is a perspective view illustrating a fuel cell stack according to an embodiment of the present invention.
Figure 2:
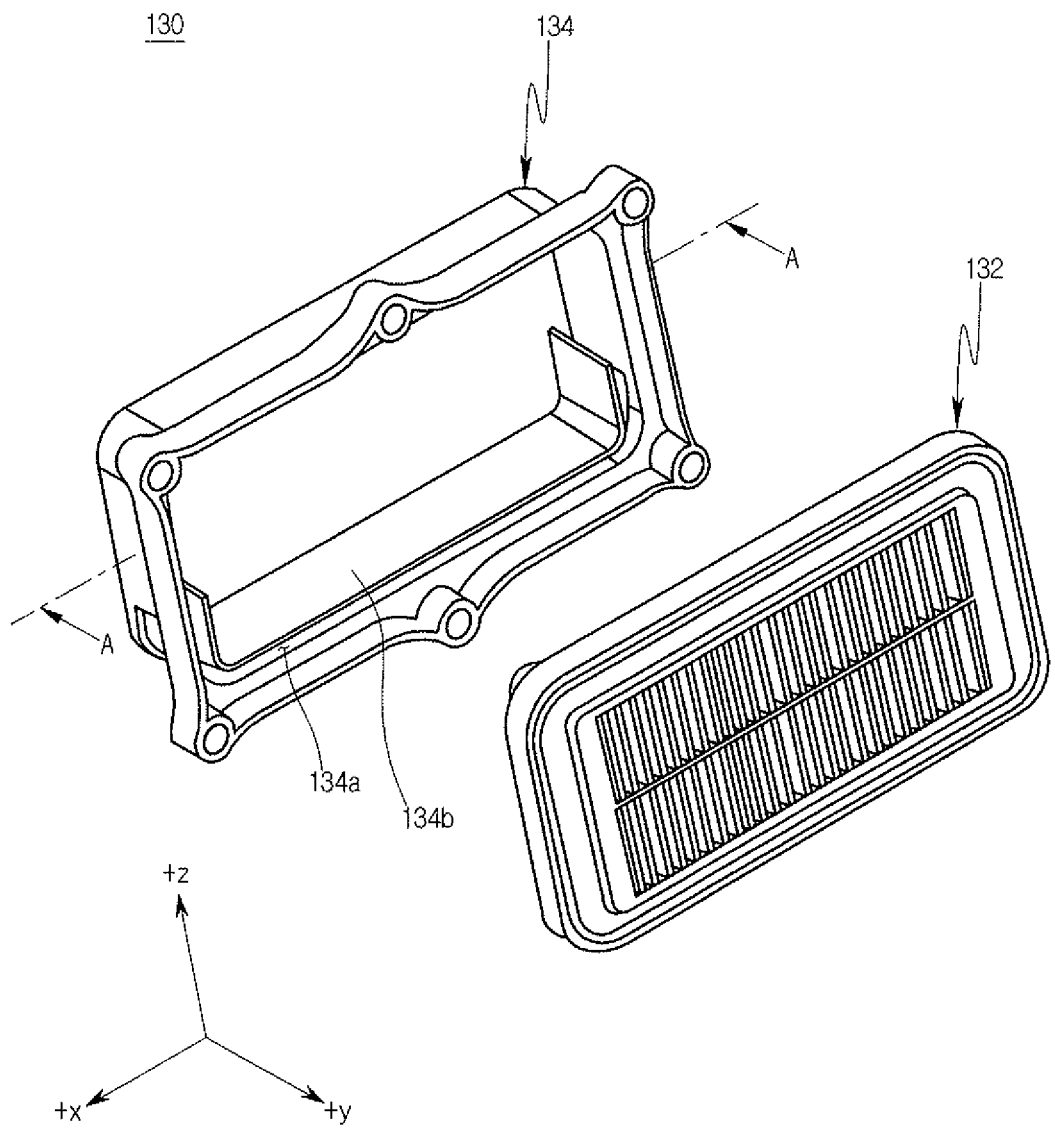
FIG. 2 is an exploded perspective view showing a filter in the fuel cell stack of FIG. 1.
Figure 3:
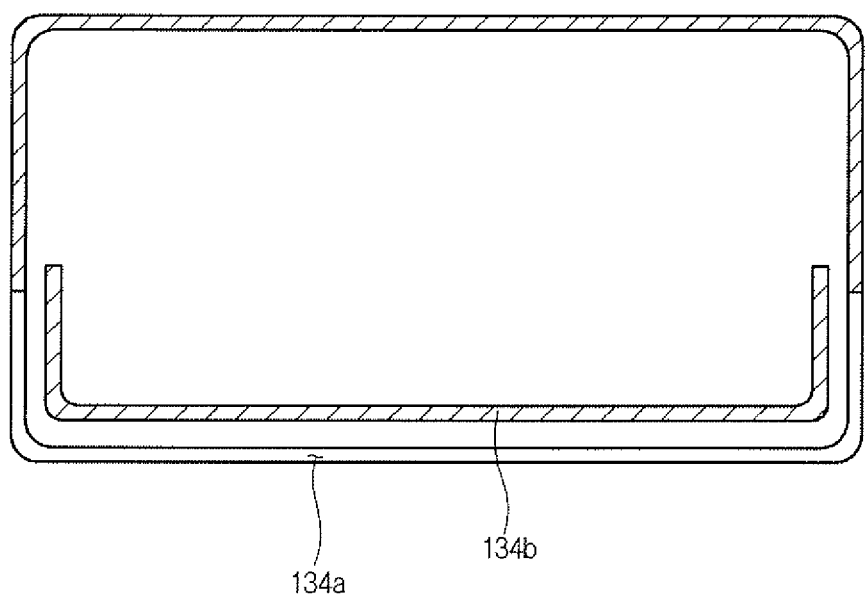
FIG. 3 is a cross-sectional view along line A-A of FIG. 2.

FIG. 1 is a perspective view illustrating a fuel cell stack according to an embodiment of the present invention, FIG. 2 is an exploded perspective view showing a filter in the fuel cell stack of FIG. 1, and FIG. 3 is a cross-sectional view along line A-A of FIG. 2.

Referring to FIGS. 1 through 3, a fuel cell stack (100) according to an embodiment of the present invention may include cells (not illustrated) for generating electrical energy and an enclosure (120) for accommodating the cells (not illustrated).

The cells (not illustrated) are formed as a plurality to generate the considerable potential required to drive a vehicle, the plurality of cells (not illustrated) are stacked to form a unit stack module, and the unit stack module can be accommodated by the interior space of the enclosure (120).

The enclosure (120) so may include an enclosure inlet for guiding air from the exterior of the enclosure (120) to the interior space of the enclosure (120) and an enclosure outlet for guiding air from the interior space of the enclosure (120) to the exterior of the enclosure (120) as to supply and discharge air required for the electrochemical reaction of the cells (not illustrated).

A filter (130) for preventing foreign matter from being introduced into the interior space of the enclosure (120) from the exterior of the enclosure (120) may be formed in the enclosure inlet.

Here, a fuel cell stack (100) according to the present embodiment, despite being equipped with the filter (130), may be formed so as to prevent foreign matter from passing through the filter (130) and being introduced into the interior space of the enclosure (120) due to the pressure of the air passing through the filter (130). In other words, the enclosure (120) and the filter (130) may be formed such that the flow rate of air entering the filter (130) is slower than a predetermined rate.

The fuel cell stack (100) in the mounted state is arranged in an engine compartment (not shown) of a vehicle (not shown). In FIGS. 1 and 2 a X axis or direction, a Y axis or direction and a Z axis or direction are depicted. In the mounted state of the fuel cell stack (100) the X direction is parallel to the longitudinal axis of the vehicle, the Y direction is parallel to the cross or traverse axis of the vehicle, and the Z direction is parallel to the vertical axis of the vehicle.

Specifically, the fuel cell stack (100) according to the present embodiment may be formed such that air is supplied directly to the filter (130) from the engine compartment of the vehicle. In other words, the filter (130) includes: a filter member (132) for covering the enclosure inlet, and a filter cover (134) for covering the filter member (132), the filter cover (134) includes a filter cover inlet (134a) for guiding air to the filter member (132), and the filter cover inlet (134a) may communicate with the engine compartment. The fuel cell stack (100) according to the present embodiment is not formed so as to forcibly supply air to the filter (130) by increasing the pressure of air on the upstream side of the filter (130) using a separate blowing means (for example, air compressor, blower).

Additionally, the filter (130) may be disposed on a part not facing the travel-induced wind of the vehicle. In other words, the enclosure (120) includes a front surface (121) facing towards the front (+x axis direction in figure) of the vehicle, a rear surface (122) facing towards the rear (−x axis direction in figure) of the vehicle, a side surface (123) facing towards the side (y axis direction in figure) of the vehicle, an upper surface (124) facing towards the top (+z axis direction in figure) of the vehicle, and a lower surface (125) facing towards the bottom (−z axis direction in figure) of the vehicle; the filter (130) may be formed on any one of the rear surface (122), side surface (123), upper surface (124), or lower surface (125) of the enclosure (120). In the present embodiment, the filter (130) may be formed on a side surface (123) of the enclosure (120).

Additionally, the filter cover inlet (134a) may be formed such that at least part of the filter cover inlet (134a) is open in a direction different from the longitudinal axis of the vehicle or front (+x axis direction in figure) of the vehicle. In the present embodiment, the filter cover inlet (134a) is open towards the bottom of the vehicle (−z axis direction in figure), and one end of the filter cover inlet (134a) may be formed to be open towards the front (+x axis direction in figure) of the vehicle, and the other end of the filter cover inlet (134a) may be formed to be open towards the rear (−x axis direction in figure) of the vehicle.

Additionally, a partition (134b) interposed between the filter member (132) and the filter cover inlet (134a) may be formed in the filter cover (134).

The partition (134b) may be formed so that air introduced into the filter cover inlet (134a) collides with the partition (134b) and is then guided to the filter member (132).

Additionally, the enclosure outlet may communicate with the air cleaner (200) of the vehicle.

The operational effects of a fuel cell stack (100) according to the present embodiment are described below.

In other words, in a fuel cell stack (100) according to the present embodiment, hydrogen is separated into hydrogen ions and electrons at the anode electrode of the cell (not illustrated), the separated hydrogen ions are transferred to the cathode of the cell (not illustrated) through the electrolyte membrane of the cell (not illustrated), hydrogen ions transferred to the cathode combine with oxygen in the air supplied to the cell (not illustrated) and with electrons flowing through an external conductor to generate water and electrical energy, and the generated electrical energy can be supplied to a driving part (for example, a motor) of the vehicle.

Here, the air required for the electrochemical reaction of the cell (not illustrated) may be supplied to the interior space of the enclosure (120) by the negative pressure of the air cleaner (200) and the air pressure inside the engine compartment (pressure of the travel-induced wind of the vehicle).

Specifically, negative pressure is generated in the interior of the air cleaner (200) when the vehicle is moving. Since the interior space of the enclosure (120) is in communication with the air cleaner (200) through the enclosure outlet, the air in the interior space of the enclosure (120) is moved to the air cleaner (200) by the negative pressure of the air cleaner (200), and a negative pressure can be generated in the interior space of the enclosure (120). Additionally, air can be supplied from the exterior of the enclosure (120) to the interior space of the enclosure (120) through the enclosure inlet by the negative pressure of the interior space of the enclosure (120). The pressure inside the engine compartment is increased by travel-induced wind of the vehicle when the vehicle is moving, and, consequently, the air in the engine compartment can be supplied to the interior space of the enclosure (120) through the enclosure inlet. In other words, air can be supplied to the interior space of the enclosure (120) by the pressure difference between the pressure of the engine compartment and the negative pressure of the air cleaner (200).

In this process, the filter member (132) removes foreign matter from the air supplied to the interior space of the enclosure (120), and the air cleaner (200) takes in air and foreign matter present in the interior space of the enclosure (120), making it possible for the interior space of the enclosure (120) to be kept clean.

Additionally, despite the filter member (132) being provided, foreign matter may pass through the filter member (132) if the flow rate (wind pressure) of the air passing through the filter member (132) is equal to or higher than a predetermined level. However, the fuel cell stack (100) according to the present embodiment can prevent such problems through various means.

In other words, as described above, the fuel cell stack (100) according to the present embodiment is formed such that air is supplied to the interior space of the enclosure (120) by the pressure difference between the pressure of the engine compartment and the negative pressure of the air cleaner (200). To put it another way, the fuel cell stack (100) according to the present embodiment is not formed so as to forcibly supply air to the filter (130) by increasing the pressure of air on the upstream side of the filter member (132) using a separate blowing means (for example, air compressor, blower). Accordingly, with the filter member (132) as a standard, the pressure difference between the upstream and downstream sides of the filter member (132) may fall below a predetermined level (a level at which foreign matter can pass through the filter (130)), and so the flow rate of the air entering the filter member (132) is reduced.

Additionally, since the filter member (132) is not formed on the front surface (121) of the enclosure (120), travel-induced wind does not flow directly into the filter member (132). In other words, the travel-induced wind can bypass this to flow into the filter member (132). Accordingly, the flow rate of the air entering the filter member (132) can be further reduced.

Additionally, since at least part of the filter cover inlet (134*a*) is open in a direction different from the direction of the vehicle leading to the front, which is the +x axis direction in figure, the flow rate of the air entering the filter member (132) can be further reduced. In other words, the filter cover inlet (134*a*) is open essentially in a direction different from the longitudinal axis of the vehicle. Small portions of the filter cover inlet (134*a*) can be open in the direction of the longitudinal axis of the vehicle.

Additionally, the flow rate of the air entering the filter member (132) can be reduced much more since the partition (134*b*) collides with the air flowing into the filter cover inlet (134*a*) to reduce the flow rate of the air and then guides the air into the filter member (132).

In accordance with this configuration, in the case of the present embodiment, the interior space of the enclosure (120) can be kept clean, and overheating, degradation of performance and efficiency, and short circuits of the fuel cell stack (100) due to foreign matter can be prevented.

Furthermore, the filter cover inlet (134*a*) in the case of the present embodiment is formed in a side of a side surface (123) of the enclosure (120) such that part of the filter cover inlet (134*a*) is open in a direction different from the front (+x axis direction in figure) of the vehicle. However, although not separately illustrated, this configuration may be variously modified.

For example, if the filter cover inlet (134*a*) is unavoidably formed on the front surface (121) side of the enclosure (120) due to a package layout, etc., the entire filter cover inlet (134*a*) may be formed to be open in a direction different from that of the front of the vehicle to minimize any increase in the flow rate of air entering the filter member (132).

As another example, the filter cover inlet (134*a*) may be formed in any one of the rear surface (122), side surface (123), upper surface (124), or lower surface (125) of the enclosure (120) such that the entire filter cover inlet (134*a*) is open in a direction different from that of the front of the vehicle to minimize the flow rate of air entering the filter member (132) as much as possible.

The invention claimed is:

1. A vehicle comprising an engine compartment and a fuel cell stack arranged in the engine compartment, the fuel cell stack including:
an enclosure having an interior space;
a cell disposed in the interior space of the enclosure configured to generate electrical energy;
the enclosure including an enclosure inlet guiding air from an exterior of the enclosure to the interior space of the enclosure, and an enclosure outlet guiding air from the interior space of the enclosure to the exterior of the enclosure;
a filter preventing foreign matter from being introduced into the interior space of the enclosure arranged in the enclosure inlet; and
wherein the filter includes a filter member covering the enclosure inlet and a filter cover covering the filter member, the filter cover including a filter cover inlet guiding air to the filter member, and wherein the filter cover inlet fluidically communicates with the engine compartment.

2. The vehicle according to claim 1, wherein the enclosure and the filter are structured and arranged such that air is suppliable directly to the filter from the engine compartment.

3. The vehicle according to claim 1, wherein:
the enclosure has a front surface facing towards a front of the vehicle, a rear surface facing towards a rear of the vehicle, a side surface facing towards a side of the vehicle, an upper surface facing towards a top of the vehicle, and a lower surface facing towards a bottom of the vehicle; and
the filter is disposed on one of the rear surface, the side surface, the upper surface, and the lower surface of the enclosure.

4. The vehicle according to claim 1, wherein at least part of the filter cover inlet is open in a direction different from a front of the vehicle.

5. The vehicle according to claim 1, wherein the filter cover further includes a partition disposed between the filter member and the filter cover inlet.

6. The vehicle according to claim 5, wherein the partition is structured and arranged such that air introduced into the filter cover inlet collides with the partition and is guided to the filter member.

7. The vehicle according to claim 1, further comprising an air cleaner, wherein the enclosure outlet fluidically communicates with the air cleaner.

8. The vehicle according to claim 1, further comprising a vehicle air cleaner arranged in the engine compartment, wherein the enclosure outlet fluidically communicates with the vehicle air cleaner.

9. A vehicle comprising an engine compartment, a vehicle air cleaner arranged in the engine compartment, and a fuel cell stack is arranged in the engine compartment, the fuel cell stack including:
an enclosure having an interior space;
a cell disposed in the interior space of the enclosure configured to generate electrical energy;
the enclosure including an enclosure inlet guiding air from an exterior of the enclosure to the interior space of the enclosure, and an enclosure outlet guiding air from the interior space of the enclosure to the exterior of the enclosure;
a filter preventing foreign matter from being introduced into the interior space of the enclosure arranged in the enclosure inlet;
wherein the enclosure outlet fluidically communicates with the vehicle air cleaner; and
wherein, in operation of the vehicle, a negative pressure of the vehicle air cleaner compared to the interior space of the enclosure moves air from the interior space of the enclosure through the enclosure outlet to the vehicle air cleaner, and a positive pressure of the engine compartment compared to the interior space of the enclosure moves air from the engine compartment through the enclosure inlet to the interior space of the enclosure.

10. The vehicle according to claim 9, wherein the enclosure and the filter are structured and arranged such that air is suppliable directly to the filter from the engine compartment.

11. The vehicle according to claim 9, wherein:
the enclosure has a front surface facing towards a front of the vehicle, a rear surface facing towards a rear of the vehicle, a side surface facing towards a side of the vehicle, an upper surface facing towards a top of the vehicle, and a lower surface facing towards a bottom of the vehicle; and
the filter is disposed on one of the rear surface, the side surface, the upper surface, and the lower surface of the enclosure.

12. The vehicle according to claim 9, wherein at least part of the filter cover inlet is open in a direction different from a front of the vehicle.

13. The vehicle according to claim 9, wherein the filter cover further includes a partition disposed between the filter member and the filter cover inlet.

14. The vehicle according to claim 13, wherein the partition is structured and arranged such that air introduced into the filter cover inlet collides with the partition and is guided to the filter member.

15. A vehicle comprising an engine compartment and a fuel cell stack arranged in the engine compartment, the fuel cell stack including:
an enclosure having an interior space;
a cell disposed in the interior space of the enclosure configured to generate electrical energy;
the enclosure including an enclosure inlet guiding air from an exterior of the enclosure to the interior space of the enclosure, and an enclosure outlet guiding air from the interior space of the enclosure to the exterior of the enclosure;
a filter preventing foreign matter from being introduced into the interior space of the enclosure arranged in the enclosure inlet;
wherein the filter includes a filter member covering the enclosure inlet and a filter cover covering the filter member, the filter cover including a filter cover inlet guiding air to the filter member, the filter cover inlet fluidically communicating with the engine compartment;
wherein the enclosure and the filter are structured and arranged such that air is suppliable directly to the filter from the engine compartment; and
wherein at least part of the filter cover inlet is open in a direction different from a front of the vehicle.

16. The vehicle according to claim 15, wherein:
the enclosure has a front surface facing towards a front of the vehicle, a rear surface facing towards a rear of the vehicle, a side surface facing towards a side of the vehicle, an upper surface facing towards a top of the vehicle, and a lower surface facing towards a bottom of the vehicle; and
the filter is disposed on one of the rear surface, the side surface, the upper surface, and the lower surface of the enclosure.

17. The vehicle according to claim 15, wherein the filter cover further includes a partition disposed between the filter member and the filter cover inlet.

18. The vehicle according to claim 17, wherein the partition is structured and arranged such that air introduced into the filter cover inlet collides with the partition and is guided to the filter member.

19. The vehicle according to claim 15, further comprising a vehicle air cleaner arranged in the engine compartment, wherein the enclosure outlet fluidically communicates with the vehicle air cleaner.

20. The vehicle according to claim 19, wherein the filter cover further includes a partition disposed between the filter member and the filter cover inlet, the partition structured and arranged such that air introduced into the filter cover inlet collides with the partition and is guided to the filter member.

* * * * *